May 7, 1963
A. A. ZUEHLKE
3,089,109
PRECISION PRESSURE TRANSDUCER
Filed Aug. 23, 1961
2 Sheets-Sheet 1
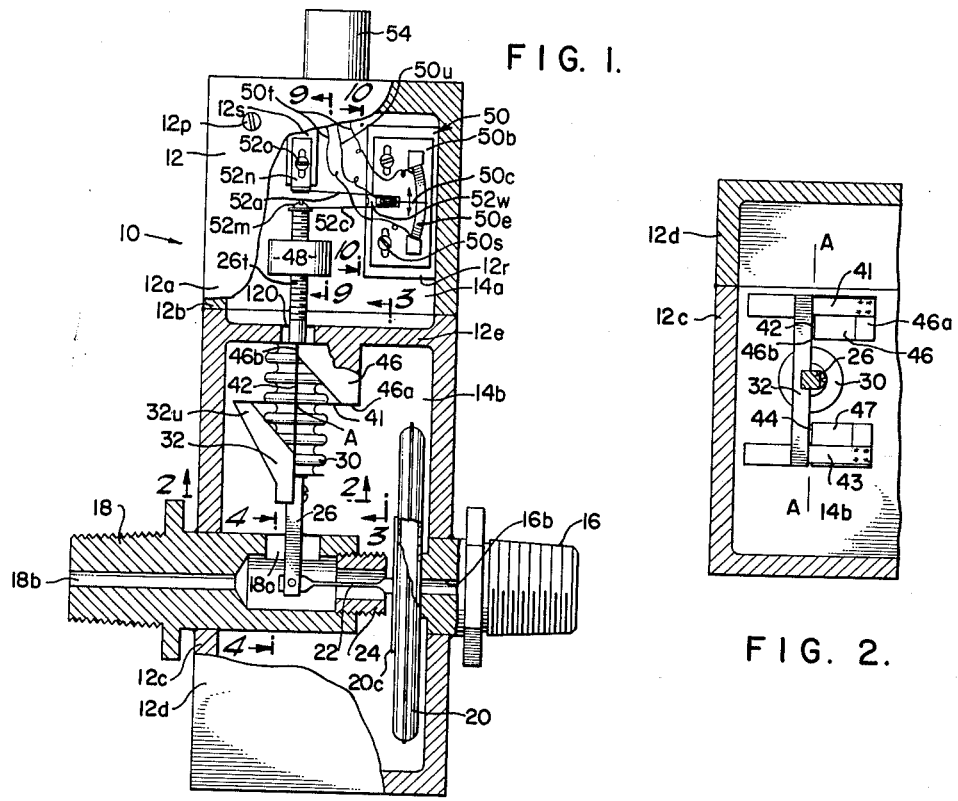
FIG. 1.
FIG. 2.
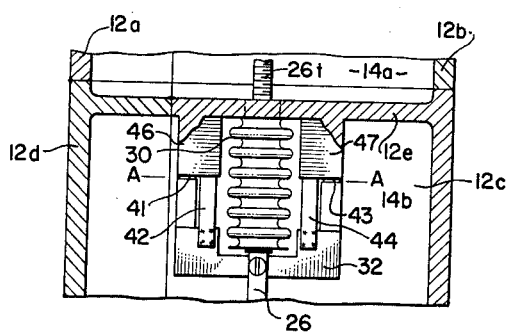
FIG. 3.
FIG. 4.
INVENTOR.
ARTHUR A. ZUEHLKE
BY 

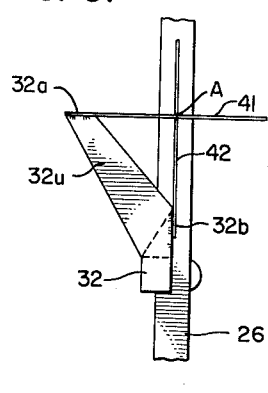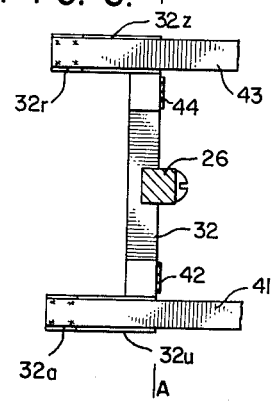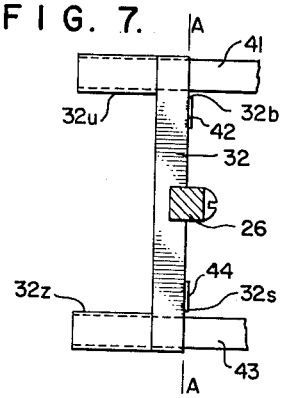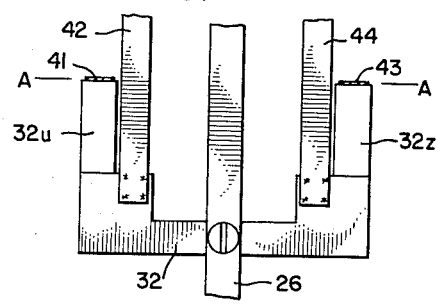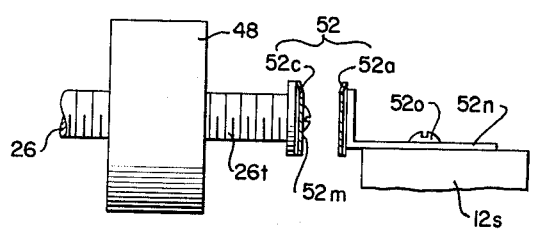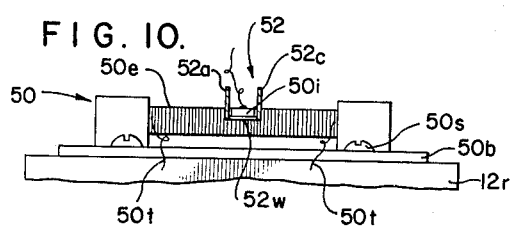

United States Patent Office 3,089,109
Patented May 7, 1963

3,089,109
PRECISION PRESSURE TRANSDUCER
Arthur A. Zuehlke, Riverside, Calif.
Filed Aug. 23, 1961, Ser. No. 133,404
19 Claims. (Cl. 338—41)

This invention relates to instruments used to furnish electrical indications of changes of pressure differential between two separated bodies of fluid; and more particularly to an instrument of improved sensitivity in which the electrical means are sealed from the pressure-sensitive means and hence may be "dry," that is, unexposed to the working fluids operable on the pressure-sensitive means, and which instrument is adapted to accurately measure small differences of pressure over an extremely wide range of pressures.

The invention uses as a pressure-difference measuring or sensing means a conventional cell of the aneroid type whose interior communicates with one source of fluid under pressure and whose exterior is exposed to a second fluid under pressure. Hence expansion or contraction of the cell from a relaxed equal-pressures condition is a measure of the difference of pressures exerted by the two fluids, irrespective of the magnitude of the higher of the two pressures. By known techniques such expansion and contraction are made to be linear with change of pressure-difference, or to conform to a prescribed mathematical function. One end of the cell is fixed relative to the frame of the instrument, and the other end has affixed thereto a movement-transmitting link comprised in means for accurately transmitting the movement through a fluid-tight pressure resisting barrier and for accurately amplifying (multiplying) the extent of the movement for operating an electrical signaling or indicating means which in the exemplary illustrated instrument is the wiper arm or contact of a variable resistor. The movement-transmitting means comprises a rod or lever that extends through and is sealed to one end of a flexible bellows whose other end is sealed around an opening through a fluid-tight barrier or wall separating the electrical-means chamber of the instrument from the fluid-filled chamber in which the sensitive cell is situated. The rod or lever is supported by dual crossed-leaf spring support means which provide an effective pivot-axis directed transversely through the bellows, and which effectively neutralize all acceleration-induced forces on the operating parts and prevent undesirable effects due to changing the maximum pressure applied to the instrument. Thus rocking movements imparted to one end by the aforementioned link are transmitted through the seal formed by the bellows and to a motion-amplifying means that also serve to actuate the wiper or movable member of the electrical means. The motion-transmitting means is so constructed that, while adjustable for regulating the degree of amplification of motion, no lost-motion can occur during reversals of direction of motion incident to opposite-sense changes of pressure-difference. Also, those means are so constructed that acceleration-effects may be completely balanced, i.e., nullified. Suitable electrical connections are provided for the electrical means, and preferably are extended to the exterior of the instrument case by way of a suitable known type of electrical quick-disconnect connector or plug.

The preceding brief description of a preferred form of structure embodying makes evident that it is a prime object of the invention to provide improvements in instruments for translating pressure differentials into electrical signals. Such instruments are commonly called "differential-pressure transducers," and herein will be so termed.

Another important object of the invention is to provide an instrument capable of accurately indicating the difference between the pressures exhibited by two fluids whose pressures differ by amounts in a small range, irrespective of the magnitude of the higher pressure relative to the ambient or static pressure level.

Another object of the invention is to provide a differential-pressure transducer having dry electrical means for translating pressure differences into corresponding electrical values, without loss of sensitivity and with no lost-motion.

Another object is to provide an instrument of the class mentioned in which adverse effects induced by acceleration of the instrument are nullified.

Another object is to provide a differential-pressure transducer permitting access within the casing of one of the fluids to be sensed and permitting damping of the electrical means by a different fluid.

Another object of the invention is to provide a differential-pressure transducer that is relatively insensitive to vibrations or oscillations at high acceleration forces or "G levels" irrespective of the direction of the acceleration forces.

Another object is to provide a very small or miniature instrument of the mentioned class.

An additional object of the invention is to provide a pivotal seal and support for a rod, that is rigid in a first direction transverse to the rod, and freely pivotal in a direction transverse to both said first direction and said rod.

Other objects and advantages of the invention will be made apparent in the appended claims and in the following description of a preferred exemplary physical instrument incorporating the principles of the invention. The preferred exemplary instrument is illustrated in the accompanying drawings forming a part of this specification. In the drawings:

FIG. 1 is a view of the exemplary instrument, with portions broken away to facilitate illustration of details;

FIG. 2 is a sectional view of a portion of the instrument taken as indicated by line 2—2 of FIG. 1;

FIG. 3 is a sectional view of a portion of the instrument taken as indicated by line 3—3 of FIG. 1, with portions broken away to show detail;

FIG. 4 is a sectional view of a portion of the instrument taken as indicated by line 4—4 of FIG. 1;

FIGS. 5, 6, 7 and 8 are detail views showing construction and arrangement of a rod-supporting yoke and crossed leaf-spring pivot means for the yoke, viewed, respectively, from above, from casing wall 12e, from the lower slotted end of rod 26, and from the right, as seen in FIG. 1;

FIG. 9 is a sectional view of flexure-link wiper arm means and supporting structure therefor, taken as indicated by line 9—9 of FIG. 1; and FIG. 10 is a sectional view illustrating the mounting of a resistance element and wiper arm detail.

Referring first to FIG. 1, the working parts of the instrument (denoted generally by ordinal 10) are enclosed in a housing or case 12 that is composed principally of sections or parts 12a, 12b, 12c and 12d. The sections are welded together as indicated to form two enclosures, 14a and 14b, separated by a wall 12e (FIG. 3). Affixed to the case 12 and protruding therefrom are two fittings, 16 and 18, whose purpose is to provide for admission to appropriate parts of the instrument the fluids the difference of the pressures of which is to be sensed and electrically indicated. The fittings enter chamber 14b through wall-openings in case 12, and are brazed or welded to the wall of the case as indicated to provide fluid-tight connections. Fitting 16 has welded thereto at its inner end the apertured face of a hollow expansible pressure-sensitive cell 20, with the interior of which the bore 16b of the fitting communicates. Affixed to the closure-cap 20c of the other face of cell 20 is a stiff resilient motion-transmitting link 22 which partakes of substantially axial motion or movement incident to expansion and/or contraction of the cell. Link 22 extends through a tubular adjustable stop-collar 24 whose external thread is engaged with an internal thread formed in the tubular inner end of fitting 18, all as indicated in FIGS. 1 and 4. The stop collar limits expansion of cell 20 to values within safe physical limits.

Secured to the flattened end of link 22 within fitting 18 is one end of a lever 26. The connection of lever 26 and link 22 may be made in any suitable way that will provide a positive rigid connection with no lost motion; and as illustrated the end of lever 26 is slotted to receive the end of link 22, and the two are pinned or riveted together and then brazed. The end of lever 26 extends through a window 18o in fitting 18, the fitting being fenestrated to allow assembly of the parts and to provide clearance for lever 26 while permitting a sound mounting for stop-collar 24 to be attained.

Lever 26 extends through and is tightly sealed (as by brazing) to a closed end of a seal-bellows 30 whose other end is sealed, by brazing or the like, around the periphery of an opening 120 formed in wall 12e. By this means, rocking movements of lever 26 are permitted while maintaining a fluid-tight barrier between chambers 14a and 14b. Lever 26 is supported for rocking or rotational movement about an axis indicated by A—A in FIGS. 2 and 3, by means of crossed leaf-spring pivots disposed on opposite (upper and lower) sides of bellows 30. For that purpose a yoke 32 is secured to the lever 26 in a manner indicated in FIGS. 5–8. The yoke comprises a central upright body secured at its center to lever 26, and is provided with an upper limb 32u which presents angularly related faces 32a, 32b (FIG. 5) to which respective ends of two angularly-related (crossed) leaf-springs 41 and 42 are respectively secured, as by spot-welding or other suitable technique. The yoke has a similar lower limb 32z which has a surface 32r (FIG. 6) substantially coplanar with surface 32a, and a surface 32s (FIG. 7) substantially coplanar with surface 32b. Preferably the two (upper and lower) sets of surfaces are in planes intersecting at right angles at the axis A—A (as shown). Respective ends of a set of lower crossed leaf-springs 43 and 44 are secured to respective ones of surfaces 32r and 32s, as by spot welding as indicated. As indicated in FIGS. 1 and 2, the other ends of upper crossed springs 41 and 42 are secured (as by spot welding) to complementary angularly-related surfaces 46a and 46b, respectively formed on a block-like pedestal 46 that extends into chamber 14a and preferably is formed integrally with wall 12e. Similarly, the other ends of lower springs 43 and 44 are secured to respective ones of faces provided on a lower block-like pedestal 47 that is substantially like pedestal 46 and similarly is preferably formed as an integral part of the casing wall 12e, as indicated in FIG. 3. As is evident from an examination of FIGS. 1 and 2, upper and lower springs 42 and 44 are substantially coplanar (when not flexed) and FIGS. 1 and 3 make it evident that springs 41 and 43 are similarly substantially coplanar, and that the plane of springs 42 and 44 passes substantially through the axis of lever 26.

Thus it is evident that when cell 20 expands or contracts, lever 26 is rocked about the axis A—A defined by the intersections of the springs, link 22 bending ever so slightly to accommodate the rocking motion of lever 26 about the axis. Bellows 30 also flexes, to the extent required, to accommodate the pivotal movement of lever 26. Also it is evident that if the portions of the lever system on opposite sides of axis A—A are dynamically balanced, acceleration forces will all be absorbed or taken by the crossed leaf-spring pivots supporting the lever 26. For example lateral acceleration forces are borne by springs 41 and 43, vertical (longitudinal) acceleration forces (as viewed in FIG. 1) are taken by springs 42 and 44, and acceleration forces in the direction of axis A—A are borne by all four springs. Since the springs are stiff in the direction of their width, and may also be very short and hence stiff in the lengthwise directions, acceleration forces may be completely absorbed by the springs, thus obviating any adverse effects on the pressure-difference functioning and indicating of the instrument. Also it is noted that longitudinal springs 42 and 44 act in compression (or in tension, in the event sub-atmospheric pressures are of interest) to absorb the force exerted upon the end of the seal bellows 30, irrespective of the magnitude of difference between the pressure in chamber 14 and that in chamber 14a. Thus the instrument may be used for sensing differences between pressures $P_1$ and $P_2$ over any desired range, even when the two pressures are extremely high and the difference-range is very small, without any change in the accuracy and sensitivity of the instrument.

Mounted on a threaded portion 26t of lever 26 within chamber 14a is a balancing nut 48 that is adjustable and that is fixed in lever-balancing position by suitable means, as by set screws and/or brazing. The adjustment is not performed until the operating parts of the instrument have been fully assembled, however. Rocking motion of lever 26, representing expansion or contraction of cell 20 and thus representing a change in pressure-differential between the fluids in bores 16b and 18b, is translated into motion of an electric signaling element, which, by moving relative to another electric signaling element, produces an electric change or signal indicative of and functionally related to, the change of pressure-differential or the pressure-differential per se. In the presently described exemplary electric signaling means, the movable signaling element is a contact or wiper of a potentiometer; however, as will be evident to those skilled in the art, equivalent electric or other signaling means may in some applications be used for translating motion of lever 26 into a physical change signal other than an electric signal. For the purpose of providing an electric signal, there is in the exemplary apparatus a variable resistor or potentiometer 50 comprising an adjustably-positioned resistance element 50e and a movable wiper or contact 50c of conductive material arranged to contact and wipe or brush along an extent of the resistance element, as is common in potentiometers. The resistance element is mounted on a base 50b which is secured to a pedestal 12r formed integrally with section 12b of the instrument casing, by means of screws such as 50s that extend through a slot-aperture in the base 50b, as indicated in FIG. 1. Contact 50c is affixed to an insulative pad 50i (FIG. 10) that is carried by a motion-multiplying wiper arm 52 which comprises two leaf-spring limbs 52a, 52c interconnected at the contact-bearing end by a preferably integral interconnecting web 52w (FIG. 10). Wiper-arm limbs 52a and 52c diverge slightly in extending from the web portion 52w toward a screw-and-slot connection 52m of limb 52c to lever 26 and toward a fixed (welded) connection of limb 52a to a slotted adjustable bracket 52n. By the screw-and-slot connection 52m the limbs 52a and 52c may be adjusted to a center position (or other desired relationship) of contact 50c on element 50e, following adjustment of the multiplication ratio of the limbs by proper placement of bracket 52n. Adjustment of the position of base 50b of the resistance element 50e may be effected to facilitate the other adjustments. Bracket 52n is mounted on a pedestal 12s by suitable means such as a screw 52o.

The preceding description makes it evident that as lever 26 is rocked, limb 52c of the wiper arm is pushed or pulled, and that since the divergent end of limb 52a at bracket 52n is held fixed relative to the casing, both limbs are flexed and contact 50c is caused to wipe in an approximately arcuate movement along an extent of resistance element 50e. In that manner, motion of link 22 incident to contraction or expansion of cell 20 is translated into a change of the electrical resistance exhibited between either of the end terminals (leads) 50t of the resistance element, and wiper contact 50c. Contact 50c is connected by a flexible lead 50u to a terminal in a connector plug 54, and the leads 50t similarly are connected to respective terminals of the plug.

It further is evident that by means of nut 48 the movable parts of the operating system may be dynamically balanced, and that the maximum extent of motion of link 22 may be fixed by stop-collar 24 at any desired value. In practice, the link 22 is displaced through only very small distances. Also the motion-amplification ratio of the wiper arm 52 may be adjusted by adjustment of bracket 52n, and the "zero" of the contact 50c may be adjusted by adjustment of base 50b on pedestal 12r and the connection 52m of limb 52c to lever 26. Following the adjustments, the casing cover-section 12d is fixed in place and welded all around its periphery to lower section 12c, thus hermetically sealing chamber 14a. Thereafter, casing cover section 12a is welded to sections 12d and 12b at the exterior lines of contact. Thus the instrument may be a "dry" instrument, with only gas in the chamber (14b) in which the electrical components are situated. However, if damping of the wiper arm is desired, a damping fluid such as a "silicone" oil may be introduced into chamber 14a through a tapped opening in cover section 12a and which opening is then closed by a sealing plug 12p.

It thus is made clear that the aforestated objects of the invention have been attained. It is evident that in the light of the present disclosure of a preferred form of exemplary apparatus according to the invention, changes and modifications will occur to those skilled in the art. Accordingly it is not desired to limit the invention to the exact details of the disclosed embodiment of apparatus, but I claim:

1. A pressure-sensor instrument comprising:
   first means, comprising expansible cell means constructed and arranged for application of separate fluids under pressure to the interior and the exterior thereof, respectively, and including chamber-defining means hermetically sealing said cell means within the defined chamber;
   second means, including flexible seal means and lever means extending through a sealed opening in said chamber-defining means, and including means supporting said lever means for pivotal movement about a defined axis, said lever means being connected to said cell whereby the cell imparts pivotal movement to said lever means incident to volume-change of said cell;
   third means, comprising motion-multiplying means connected to said lever means outside said chamber and constructed and arranged to amplify movements imparted to said lever means by said cell means; and
   fourth means, comprising electric signaling means, connected to said third means and constructed and arranged to translate the amplified movements of said third means into electric signals representative of said movements, whereby said electric signals are representative of the respective difference of the pressures exhibited by said fluids on the interior and the exterior of said cell.

2. An instrument according to claim 1, said supporting means included in said second means comprising first and second sets of crossed leaf-springs arranged on respective opposite sides of the dynamic center of said lever means and with their crossings aligned to define an axis directed through the dynamic center of said lever means.

3. An instrument according to claim 1, said motion-multiplying means comprising first and second elongate spring members rigidly interconnected adjacent first ends thereof and extending divergently away from their interconnected ends, the divergent end of the first spring member being securely connected to an end portion of said lever means and the divergent end of the second spring member being fixedly anchored to said chamber-defining means, and said signaling means comprising a movable signaling element supported by the interconnected ends of said elongate spring members.

4. An instrument according to claim 3, said signaling means comprising a potentiometer comprising resistance element means affixed to said chamber-defining means and comprising as said movable signaling element a potentiometer contact supported by said elongate spring members.

5. A differential-pressure transducer adapted for translating differences in pressures exhibited by first and second fluids within a relatively small range of such differences, and adapted to perform such translation irrespective of the magnitudes of the said pressures relative to the ambient, said transducer comprising:
   first means, comprising chamber-forming means including first and second means for admitting first and second fluids to within the formed chamber, and seal means;
   second means, comprising an elastic variable-volume cell within said chamber and constructed and arranged to be exposed at its exterior to said first fluid and connected to receive said second fluid into its interior, whereby changing differences between the pressures exhibited by said first and second fluids change the volume and at least one dimension of said cell;
   third means, comprising dynamically balanced pivotal means connected to said cell to be displaced thereby incident to change of volume in said cell, said pivotal means extending out of said chamber through the seal means included in said first means;
   fourth means, comprising crossed leaf-spring pivot means disposed on each of opposite sides of said pivotal means and connected to pivotally support the latter, constructed and arranged to restrict movements of said pivotal means to pivotal movements about an axis defined by said pivot means; and
   fifth means, comprising means connected to said pivotal means externally of said chamber for amplifying movements of said pivotal means and for translating the amplified movements into respective electrical signals.

6. A differential-pressure transducer comprising:
   first means, including casing means forming an enclosed chamber, and having provision for admission of fluid under pressure into the chamber;
   second means, including a pressure-sensitive elastic cell disposed in said chamber with an exterior surface exposed to a first fluid in said chamber, and means affixing a part of said cell to said first means and for admitting a second fluid under pressure to the interior of said cell, whereby said cell expands and contracts in response to changes in the pressure-differential between said first and second fluids;
   third means, comprising motion-transmitting means and hermetic seal means therefor, said motion-transmitting means being connected to said cell to be moved thereby in response to expansion and contraction thereof and to transmit motion imparted thereto through said seal means to the exterior of said chamber;
   fourth means, comprising motion-amplifying means, connected to said motion-transmitting means and constructed and arranged to accurately amplify the movements thereof; and
   fifth means, comprising electrical signaling means, connected for actuation by said motion-amplifying means and constructed and arranged to produce accurate electrical-signal indications of movements of said motion-amplifying means, whereby said electrical-signal indications accurately represent said changes in the pressure-differential between said first and second fluids.

7. A differential-pressure transducer comprising:
first means, including casing means forming an enclosed chamber;
second means, comprising differential-pressure sensor means, arranged in said chamber, and means for admitting first and second fluids under pressure into said chamber and to the exterior and interior, respectively, of said sensor means, whereby changes in the pressure-difference between said fluids cause corresponding displacement of a part of said sensor means;
third means, comprising displacement-transmitting means connected to said sensor means and sealed to and passing out of said chamber, for transmitting displacements of said sensor means to the exterior of the casing; and
fourth means, comprising motion-translating means outside said chamber, connected to said displacement-transmitting means and effective to amplify the displacements thereof, and constructed and arranged to translate the amplified displacements into electrical indications of the displacements of said displacement-transmitting means, whereby said electrical indications are accurately representative of changes in the difference in pressures exerted on the exterior and interior of said cell by said first and second fluids.

8. A transducer as defined by claim 7, said displacement-transmitting means comprising a lever and means pivotally mounting said lever and restricting the lever to purely pivotal motion, and comprising means connecting an interior end of said lever within said chamber to said sensor and flexible seal means flexibly connecting and sealing the lever and said first means, whereby pivotal displacements of said lever are transmitted outside said chamber past said seal means to an exterior end of said lever, and motion-amplifying and translating means connected to the exterior end of said lever.

9. A transducer as defined by claim 8, said motion-amplifying means including first and second convergent elongate spring members rigidly interconnected at their convergent ends by bridge means forming a part of said fourth means and having resilient diverging portions extending away from said bridge means, said fourth means comprising means constraining the divergent end of said first spring member to movement with the exterior end of said lever and constraining the divergent end of said second spring member against movement relative to said casing means, and electrical indicating means connected to and actuated by said bridge means.

10. A transducer as defined by claim 9, said electrical indicating means comprising a movable potentiometer contact carried by said bridge means and a potentiometer resistance element mounted on said first means.

11. A differential-pressure transducer adapted for producing accurate indications of differential-pressures within a small range of pressure-differences irrespective of the magnitude of the static pressure within a very large range of static pressures, said transducer comprising:
stationary means, comprising casing means, providing a sealed chamber and means for introducing a first fluid under pressure to said chamber;
pressure-sensor means, comprising an elastic cell and means for anchoring a stationary portion of said cell in said chamber and for admitting a second fluid under pressure into the interior of said cell from outside said chamber, whereby a movable portion of said cell is displaced incident to change in the difference between the pressures exhibited by said first and second fluids;
displacement-transmission means, connected to said pressure-sensor means for displacement thereby in response to displacements of said movable portion of said cell and comprising an elongate lever and pivotal support means therefor, constructed and arranged with flexible hermetic seal means to extend outwardly of said chamber, said lever being constrained against longitudinal movement only by said pivotal support means whereby longitudinal forces applied on said lever are borne by said pivotal support means and a free end of said lever extends out of said chamber through a flexible hermetic seal;
displacement-amplifying means attached to said stationary means and said lever for actuation by and amplification of pivotal displacements of the lever;
and electrical signaling means, constructed and arranged for actuation by said displacement-amplifying means, for producing electric signals accurately representing pressure-differentials sensed by said pressure-sensor means.

12. A differential-pressure transducer as defined by claim 11, said pivotal support means comprising first and second sets of spring members each set of which includes at least first and second elongate springs disposed in crossing relationship and said sets of spring members being arranged with their crossings aligned to define a pivotal axis for said lever, a first end of each of said spring members being connected to said lever and the second end of each of said spring members being connected to said stationary means, whereby incident to translation of one end of said lever said spring members are all flexed and permit rotary motion of said lever about said axis, the first spring of each set of said spring members being disposed parallel with the longitudinal axis of said lever and preventing longitudinal motion of said lever relative to said stationary means.

13. A differential-pressure transducer as defined by claim 12, the second spring of each set of said spring members being disposed substantially at right angles to the first spring of the corresponding set; and said lever having a balance point on said pivotal axis, whereby acceleration-induced forces exerted by said lever are borne by said sets of spring members.

14. A differential-pressure transducer according to claim 13, said displacement-amplifying means comprising first and second convergently disposed spring limbs and bridge means rigidly interconnecting the convergent end portions only of the limbs, and comprising means attaching the divergent end portion of one said limbs to said stationary means and means attaching the divergent end portion of the other of said limbs to an end portion of said lever and transversely of the axis thereof whereby said limbs are flexed by displacement of said end portion of said lever to impart an amplified displacement to said bridge means.

15. A transducer according to claim 14, said electric signaling means comprising a potentiometer contact carried by said bridge means and a potentiometer resistance element mounted on said stationary means in cooperative relationship with said contact.

16. A pressure transducer comprising:
first means, comprising stationary casing means defining first and second enclosed chambers separated by a wall with an opening through said wall, and means for admitting fluid under pressure to said first chamber;
second means, comprising elongate lever means extending through said opening wtih a first end in said first chamber and a second end in said second chamber, and flexible hermetic-seal means secured to said lever means and to said casing means, to prevent passage of fluid from said first chamber to said second chamber;
third means, comprising pivotal mounting means secured to said lever means and to said casing means, constraining said lever means to pivotal displacements about an axis transverse to the length of said lever means;

fourth means, comprising a variable-volume pressure-sensitive cell disposed in said first chamber and connected to the first end of said lever means, constructed and arranged to pivotally displace said first end of said lever means incident to change of pressure exerted on said cell and change of volume thereof; and fifth means, comprising motion-transducer means, disposed in said second chamber and connected to the second end of said lever means for actuation thereby, constructed and arranged to accurately translate pivotal displacements of said lever means into corresponding electrical indications of the changes of volume of said cell, whereby changes of pressure exerted by fluid on surfaces of said cell are accurately translated into corresponding electrical signals and whereby fluid admitted to said first chamber is isolated from said fifth means.

17. A pressure transducer according to claim 16, said fifth means comprising displacement-amplifying means connected to said lever means for actuation thereby and electric potentiometer means connected for actuation by said displacement-amplifying means.

18. A pressure transducer according to claim 16, said pivotal mounting means comprising first and second sets of leaf-spring members arranged on respective opposite sides of said lever means and each set comprising first and second spring members each having first and second ends, the first spring members being arranged parallel to the longitudinal axis of said lever means and the second spring members being arranged crosswise of the respective first spring members, the first end of each of the spring members being rigidly attached to said lever means and the second end of each of the spring members being rigidly attached to said casing means, whereby said lever means is restricted to rotational displacement about an axis defined by the crossings of said springs and passing substantially through the longitudinal axis of said lever means.

19. A pressure transducer according to claim 16, said first means and said fourth means comprising means for admitting fluid under pressure to the interior of said cell.

References Cited in the file of this patent

UNITED STATES PATENTS

| | | |
|---|---|---|
| 2,973,496 | Gibbs | Feb. 28, 1961 |
| 3,032,733 | Zuehlke | May 1, 1962 |

FOREIGN PATENTS

| | | |
|---|---|---|
| 862,491 | Great Britain | Sept. 15, 1959 |